United States Patent
Barthelme et al.

(10) Patent No.: US 12,092,181 B2
(45) Date of Patent: Sep. 17, 2024

(54) WAVE SPRING

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Alexander Dilje, Schweinfurt (DE); Hans-Juergen Friedrich, Königsberg-Römershofen (DE); Sebastian Kraus, Schwanfeld (DE); Alfred Radina, Poppenlauer (DE); Andreas Herbert Kraus, Bergrheinfeld (DE)

(73) Assignee: AKTIEBOLAGET SKF, Gothenburg (SE)

(*) Notice: Subject to any disclaimer, the term of this patent is extended or adjusted under 35 U.S.C. 154(b) by 164 days.

(21) Appl. No.: 17/824,925

(22) Filed: May 26, 2022

(65) Prior Publication Data

US 2022/0389964 A1 Dec. 8, 2022

(30) Foreign Application Priority Data

Jun. 8, 2021 (DE) .......................... 102021205783.7

(51) Int. Cl.
| | |
|---|---|
| *F16F 1/04* | (2006.01) |
| *F16F 1/02* | (2006.01) |
| *F16F 1/32* | (2006.01) |
| *F16F 1/34* | (2006.01) |

(52) U.S. Cl.
CPC .............. *F16F 1/028* (2013.01); *F16F 1/048* (2013.01); *F16F 1/328* (2013.01); *F16F 1/34* (2013.01)

(58) Field of Classification Search
CPC .. F16F 1/028; F16F 1/048; F16F 1/328; F16F 1/34
See application file for complete search history.

(56) References Cited

U.S. PATENT DOCUMENTS

| | | | | |
|---|---|---|---|---|
| 4,901,987 A | * | 2/1990 | Greenhill .................. | F16F 1/06 267/182 |
| 6,068,250 A | * | 5/2000 | Hawkins ................. | F16F 1/328 267/164 |
| 6,669,184 B2 | * | 12/2003 | Cai ......................... | F16F 1/328 267/180 |
| 6,758,465 B1 | * | 7/2004 | Greenhill .................. | F16F 1/06 267/162 |
| 9,702,403 B2 | * | 7/2017 | Beck ....................... | F16C 19/06 |

(Continued)

FOREIGN PATENT DOCUMENTS

| | | |
|---|---|---|
| DE | 7738870 U1 | 12/1977 |
| DE | 102014216506 A1 | 2/2016 |

*Primary Examiner* — Thomas W Irvin
(74) *Attorney, Agent, or Firm* — J-TEK LAW PLLC; Scott T. Wakeman; Mark A. Ussai

(57) ABSTRACT

A wave spring having an axially resilient spring section including at least one one-layer wave-shaped spring configured to provide a spring force in an axial direction of the wave spring, and a radially resilient spring section configured to provide a spring force in a radial direction. The wave spring may be made from a continuous flat wire that forms both the axially resilient spring section and the radially resilient spring section, the flat wire being rotated 90° at a transition from the axial spring section to the radial spring section.

17 Claims, 3 Drawing Sheets

(56) References Cited

U.S. PATENT DOCUMENTS

| | | | |
|---|---|---|---|
| 11,401,967 B2* | 8/2022 | Heile | F16C 43/04 |
| 11,867,247 B2* | 1/2024 | Kampmann | F16F 1/048 |
| 11,898,607 B2* | 2/2024 | Barthelme | F16C 35/077 |
| 2003/0222385 A1* | 12/2003 | Cai | F16F 1/328 |
| | | | 267/162 |
| 2016/0097434 A1* | 4/2016 | Russell | F16F 1/328 |
| | | | 267/162 |
| 2021/0317871 A1* | 10/2021 | Heile | F16C 27/04 |
| 2022/0381311 A1* | 12/2022 | Jeng | F16F 1/373 |
| 2022/0389956 A1* | 12/2022 | Barthelme | F16C 23/08 |
| 2022/0389957 A1* | 12/2022 | Barthelme | F16C 27/04 |
| 2022/0389958 A1* | 12/2022 | Barthelme | F16C 27/066 |
| 2023/0081050 A1* | 3/2023 | Kampmann | F16F 1/048 |
| | | | 267/161 |

* cited by examiner

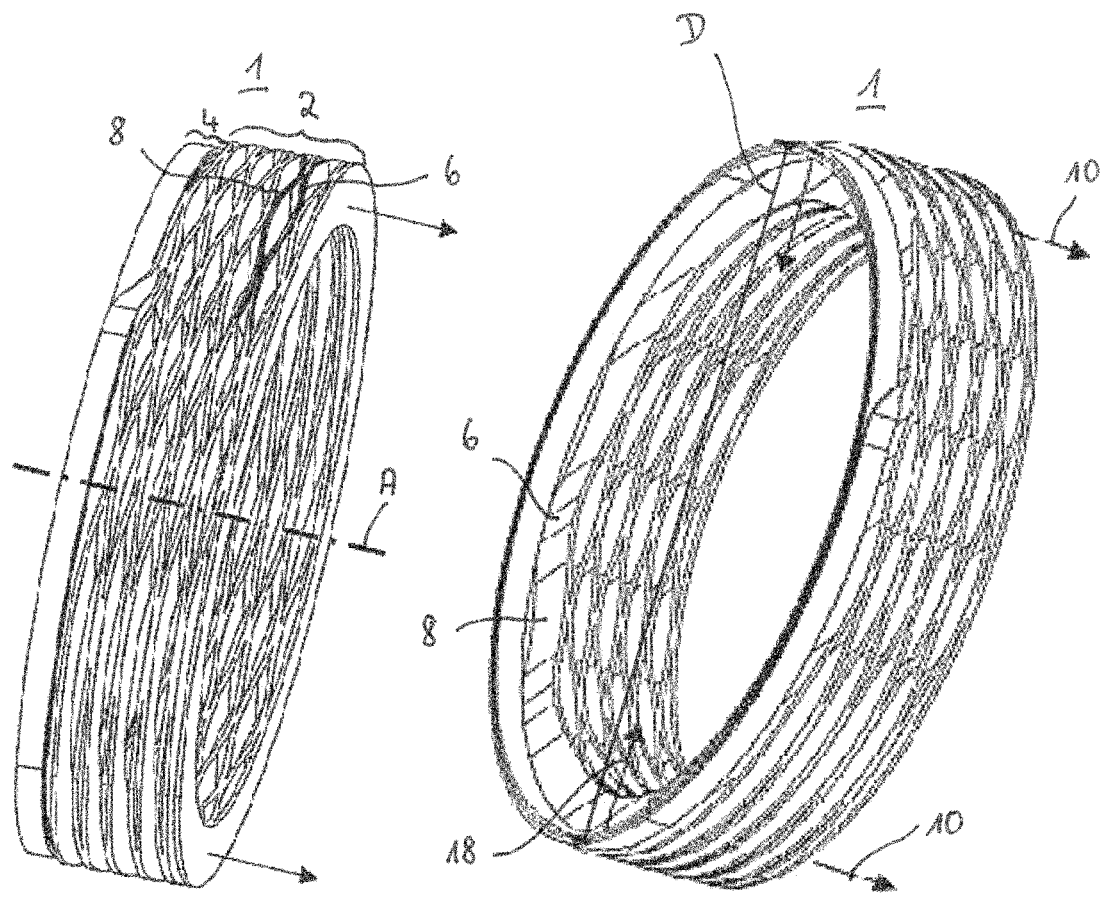
Fig. 1
Fig. 2
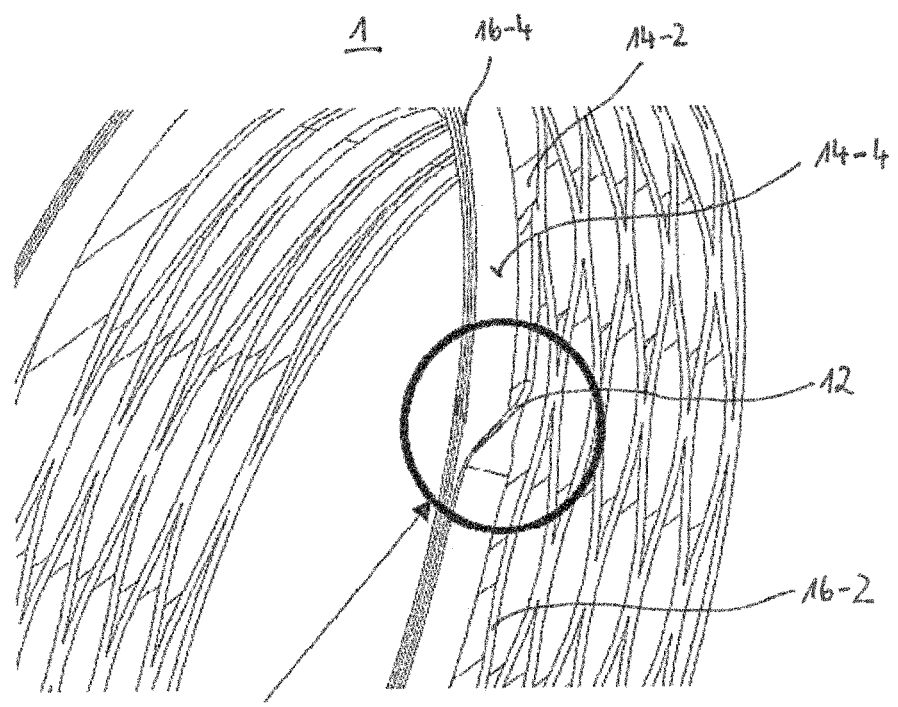
Fig. 3

WAVE SPRING

CROSS-REFERENCE

This application claims priority to German patent application no. 10 2021 205 783.7 filed on Jun. 8, 2021, the contents of which are fully incorporated herein by reference.

TECHNOLOGICAL FIELD

The present disclosure is directed to a wave spring as well as to a bearing assembly including such a wave spring.

BACKGROUND

With axially preloaded machine elements, such as, for example, bearings, in particular a rolling-element bearing, a wave spring is often used for applying an axial spring force onto the machine part, in particular one of the bearing rings. Here the wave spring is supported on its an axial side against the corresponding bearing ring and on its other axial side against a stop, such as, for example, a housing or shaft part. The spring itself is usually inserted loosely between the housing part or the stop and the corresponding bearing ring. A direct attachment of the spring to the corresponding bearing ring is currently only possible with a very high installation effort, which is therefore usually avoided.

SUMMARY

An aspect of the present disclosure is therefore to provide a wave spring that can be attached to a bearing assembly in a simple manner.

In the following a wave spring is presented that is configured in particular as a flat-wire wave spring and that includes a first axially resilient spring section that has at least one one-layer wave-shaped spring layer that provides a spring force in the axial direction of the wave spring. In order to attach this wave spring to a bearing assembly or to another machine part, the wave spring includes a further radially resilient spring section that is configured to exert a radial spring force. With the aid of this radially acting spring force, the wave spring can be operatively connected to the machine part, for example, the bearing ring, so that via the radial spring section a friction- and/or force-fit between the wave spring and the machine element can be provided. This allows the wave spring to easily be attached to the corresponding machine part.

According to one preferred exemplary embodiment, the radially resilient spring section includes a radially resilient spiral spring including at least one winding. A radially resilient spiral spring is on the one hand easy to manufacture and on the other hand has a maximum friction surface due to its circumferential enclosing of the machine element, which maximizes the friction- or force-fit. If the circumferentially resilient spiral spring has not only one winding, but a plurality of windings lying one-atop-the other, then the friction forces in the spring windings themselves increase the spring force and thus improve the seat of the spring against the machine element.

According to a further preferred exemplary embodiment, the radially resilient spring section is configured as a radially resilient membrane or plate spring. Such a design makes possible a simple installation on the corresponding machine element without unnecessarily reducing the strength of the friction- and/or force-fit in order to ensure an installability on the machine part or the bearing ring.

Furthermore, it is preferred that the axially resilient spring section and the radially resilient spring section are manufactured from the same spring steel. Such a design prevents the spring effect from decreasing due to different thermal expansions.

According to a particularly preferred exemplary embodiment, the wave spring is manufactured from a continuous flat wire that forms both the axially resilient spring section and the radially resilient spring section. For this purpose the flat wire can advantageously be rotated by 90° at the transition from the axially to the radially acting spring section so that a maximum abutment surface and thus also a maximum friction surface can be provided for the radial spring section. In addition, the wave spring can be manufactured in one manufacturing step without further costs and assembly expense.

According to a further preferred exemplary embodiment, the radially resilient spring section is manufactured from different material than the axially resilient spring section. Here both materials can indeed also be spring steel or metal; however, the alloy of the radially resilient spring steel is different than the axially resilient spring steel. Different requirements can thereby be addressed, and the spring forces can be optimized. Of course, it is also possible to manufacture the radially resilient spring section from a completely different material than the axially resilient spring section. For example, the radially resilient spring section can be comprised of a plastic material, while the axially resilient spring section is still manufactured as before from a spring steel. Thus it is possible, for example, to mold the radially resilient spring section onto the axially resilient spring section via an overmolding method, in which in particular the radially resilient spring section includes radially acting spring tongues. Furthermore, it is advantageous when the radially resilient spring section is manufactured from an elastomer material. If such an elastomer material is used, then, for example, the axially resilient spring section and the radially resilient spring section can be connected to each other, for example, via vulcanization, so that the radially resilient spring section provides the radial spring effect via an elastic deformation of the material. This is the case, for example, with a rubber sleeve or a rubber ring.

A further aspect of the present disclosure is a bearing assembly including a bearing unit that includes at least one outer ring and one inner ring that are configured to rotate with respect to each other. Here the bearing unit can preferably be configured as a rolling-element bearing. Furthermore, a wave spring, as described above, is disposed on the outer ring or the inner ring, wherein the radially resilient spring section interacts with the inner ring or outer ring such that the wave spring is attached to the bearing unit. A premanufactured bearing assembly can thereby be provided that is introduced as a whole in an application, for example, on a shaft or in a housing, wherein an axial suspension or cushioning of the bearing unit is desired.

It is advantageous here in particular when the outer ring or the inner ring includes a circumferentially extending recess in which the radially resilient spring section can be received. A spring seat can thereby be provided on the bearing ring itself, which spring seat is simple to manufacture since the radial recess can be co-manufactured directly during the post-turning treatment of the bearing ring without a further processing step being necessary. Here the circumferentially extending recess offers a defined space for the wave spring both in the axial direction and in the radial direction, more precisely for the radial section of the wave spring, and it can simultaneously be ensured that the wave spring can be securely attached to the circumferentially extending recess with radial spring force. In addition, the recess can be used to ensure that the wave spring does not increase the installation space required for the bearing.

According to a further preferred exemplary embodiment, the recess can also be configured as a groove in which the radially acting section of the wave spring engages at least partially. The wave spring can thereby be attached to the bearing ring not only via friction fit, but also via interference-fit, which provides for an improved axial fixing of the spring. Here the groove can be U-shaped, but it is also possible to shorten one leg, preferably the leg pointing toward the bearing outer side.

According to a further preferred exemplary embodiment, the radially circumferentially extending recess is also designed slightly oval or elliptical so that a circumferential movement of the wave spring, which is essentially circular in cross-section, on the bearing ring in the circumferential direction is prevented. Of course, the wave spring can also be configured slightly oval and the recess essentially circular, or both can be slightly oval.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWINGS

FIG. 1 is a schematic three-dimensional view of a preferred exemplary embodiment of a wave spring.

FIG. 2 is a second schematic three-dimensional view of the wave spring from FIG. 1.

FIG. 3 is a detail view of the wave spring from FIGS. 1 and 2.

DETAILED DESCRIPTION

Figure 4:
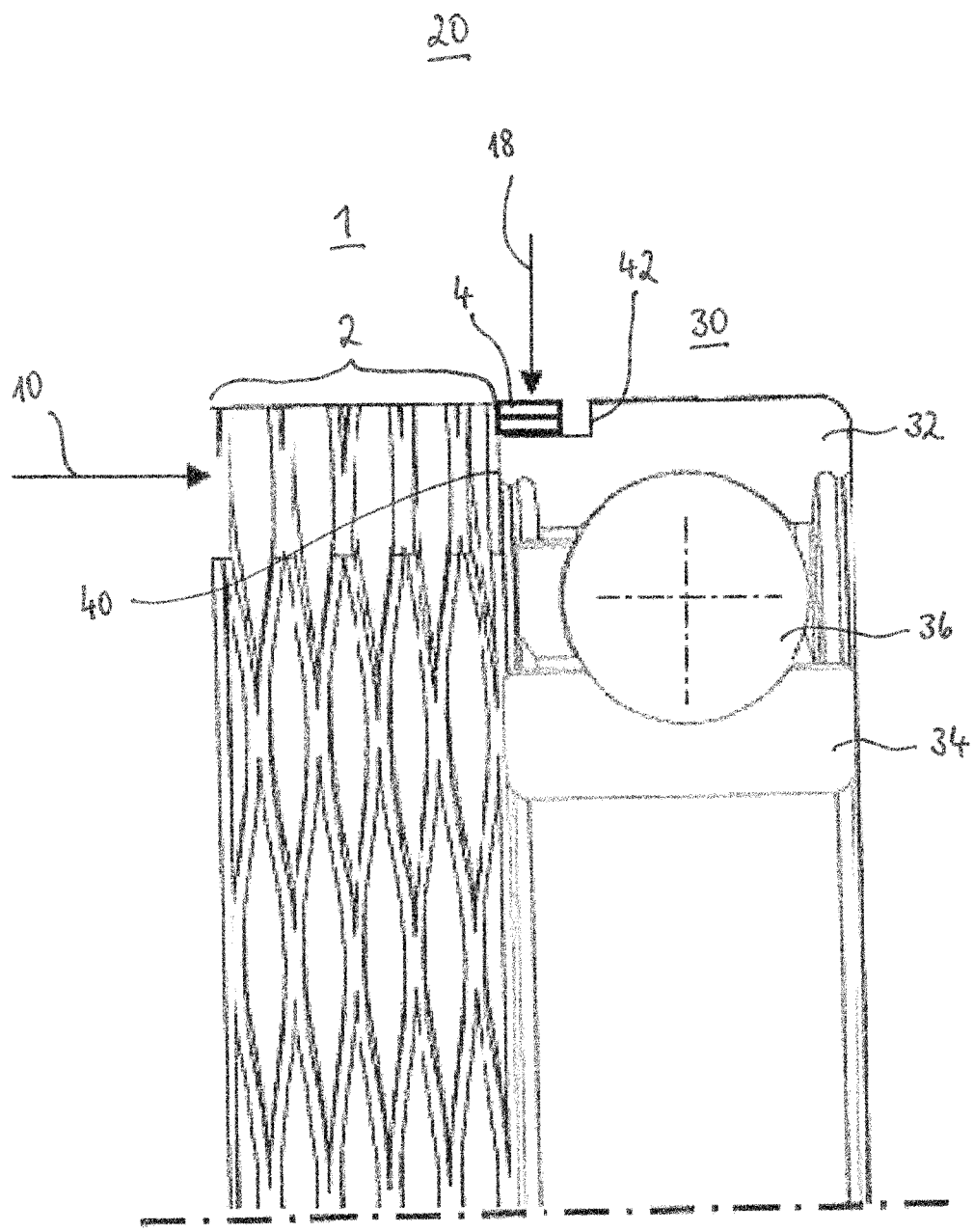
FIG. 4 is a schematic cross-sectional view of a bearing assembly including a wave spring of FIGS. 1-3 attached to a bearing outer ring.

In the following, identical or functionally equivalent elements are designated by the same reference numbers.

FIGS. 1, 2 and 3 show various views of a wave spring 1, wherein the wave spring is circular cylindrical in cross-section and has an axis A. Furthermore, the wave spring 1 includes an axially resilient section 2 and a radially resilient section 4. The axially resilient section 2 comprises a plurality of layers of a spring steel designed in an undulating manner, as can also be seen in particular from FIGS. 2 and 3. Here the axially resilient section 2 is usually formed from a one piece flat wire that is laid one-atop-the-other in layers, wherein the waves of the spring steal interact with one another such that a wave peak 6 of one layer contacts a wave trough 8 of an adjacent layer, so that the characteristic wave pattern, depicted in FIGS. 1 to 3 for a wave spring is formed. Due to this arrangement of the wave peaks 6 and wave troughs 8, the axial section 2 is able to spring in the axial direction, as depicted by the arrows 10.

In the exemplary embodiment depicted, the radial section 4 is formed from the same spring steel or flat wire as the axially resilient section. In the exemplary embodiment depicted, a one piece flat wire is also used that forms both the radially and the axially resilient section. Here it is particularly preferred when the flat wire is rotated by 90° at the end of the last position, as can be seen from the detail view of FIG. 3. This means that the flat wire is placed in an axial orientation from a radial direction so that its wide side 14 extends in the axial direction in the radial section. In the axial section 2, the wide side 14-2 of the flat-band wire is thus oriented in the radial direction, while the radial surface is formed by the end side 16-2, i.e., the narrow side of the flat wire. In contrast, in the radial section 4, the wide side 14-4 of the flat wire is directed in the radial direction and forms the radial surface, while the end surface or narrow side 16-4 of the flat wire forms an axial side.

Also in the radial region 4, a plurality of layers of the flat-band spring steel are laid one-atop-other but do not have a wave shape in the exemplary embodiment depicted. The spring effect is thus that of a spiral spring that is expanded or compressed in terms of diameter for a radial spring effect.

In the exemplary embodiment depicted in FIGS. 1 to 3, the spring effect of the radially resilient section 4 is directed radially inward, which is indicated by the arrows 18. This simultaneously means that for a spring effect the diameter D of the radial spring section 4 is enlarged. On the inner side of the radially resilient section, an operative connection can thus be established to an element on which a radial spring effect is to be exerted or to which the wave spring 1 is to be attached.

FIG. 4 shows such an application case of a bearing assembly 20 in which the wave spring 1 is attached to a bearing unit 30. The bearing unit 30 includes an outer ring 32 and an inner ring 34 that are rotatably supported with respect to each other and in whose intermediate space, in the exemplary embodiment depicted, a rolling element in the form of a ball is disposed. Of course, another type of rolling elements, for example, a ball roller bearing, toroidal roller bearing, or cylindrical roller bearing, or also a plain bearing can be designed including a wave spring. Furthermore, it can be seen from FIG. 4 that a circumferential recess 38 is provided on the outer ring 32. This circumferential recess 38 can easily be produced during the manufacturing of the outer ring 32.

In order to connect the wave spring 1 to the bearing unit 30, it is furthermore provided that the radially acting spring section 4 is received in the circumferential recess 38. Here the inner diameter D of the radially acting spring section 4 is configured such that in the relaxed state it has a smaller diameter than the circumferential recess 38. In order that the radially acting spring part can be attached to the bearing ring 32, it must therefore be expanded so that it is movable into the recess 38. The spring of the radially acting spring section 4 is thereby tensioned and exerts a radially inward spring force on the outer ring 32. This allows the wave spring 1 to be attached to the bearing unit 30 without additional material interventions being required. The axial spring force is in turn provided via the axially resilient section 2.

Due to the friction between recess 38 or bearing ring 32, 34 and the wave spring 1, which friction is applied by the radial spring force, a rotation of the wave spring 1 relative to the bearing ring 32, 34 in the circumferential direction is also prevented. This rotation can furthermore be prevented when one of the parts, the wave spring 1 or the recess 38, is not circular, but rather slightly oval, while the other part is essentially circular. This oval design then also blocks or prevents rotation. Of course, both parts can also be designed oval.

Furthermore, it can be seen from FIG. 4 that the axial spring section can additionally be supported on an end surface 40 of the outer ring so that a defined seat of the wave spring 1 on the bearing unit 30 can be provided. Alternatively or additionally, the recess 38 can also include at least one stop 42 that can interact with the end surfaces 16-4 of the radially resilient section 4 of the wave spring 1. The wave spring 1 can thereby also be provided with a defined seat on the bearing ring 32.

Figure 5:
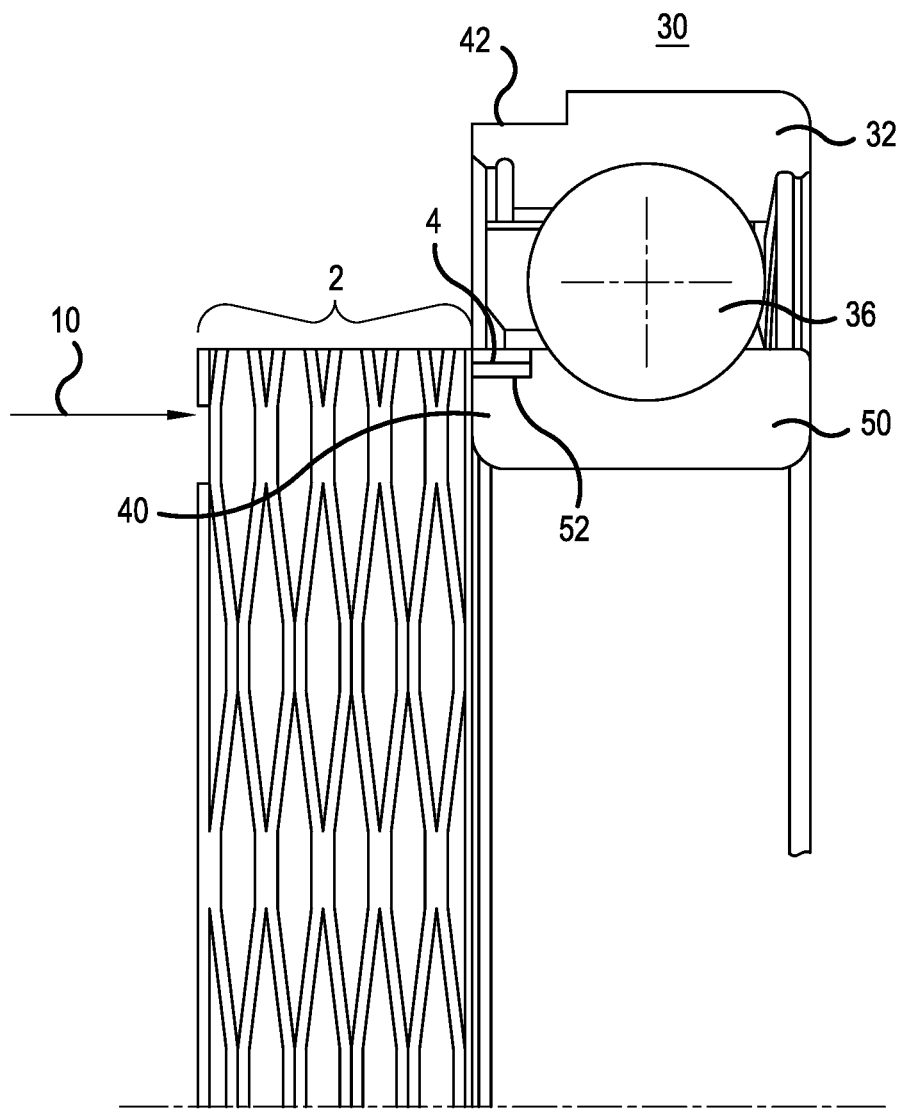
FIG. 5 is a schematic cross-sectional view of a bearing assembly including a wave spring of FIGS. 1-3 attached to a bearing inner ring.

Of course, as shown in FIG. 5, it is also possible to attach the wave spring 1 to an inner ring 50. In a manner analogous to the above-described design, this can be made possible by a recess 52 on the side of the inner ring 50 facing the outer ring 32. If, in contrast, the recess 52 is formed on the machine part carrying the inner ring 50, for example, a shaft, the radially acting spring section 4 must be configured as radially outwardly resilient. This is also possible, for example, with a correspondingly designed spiral spring. A radially outwardly resilient radial spring section 4 also makes possible an attaching of the wave spring 1 to a side of the outer ring 32 facing the inner ring 34.

Overall, with such a wave spring a simple installing of the wave spring on a machine element, such as, for example, a bearing unit, can be made possible so that a preassembled bearing assembly made of bearing unit and wave spring can be provided. Here no further material or mechanical attachment elements are necessary since the attaching is effected via friction forces or spring forces.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved wave springs.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Wave spring
2 Axially resilient section
4 Radially resilient section
6 Wave peak
8 Wave trough
10 Axial spring direction
12 90° rotation of the spring-steel flat wire
14 Wide side of the spring-steel flat wire
16 Narrow side of the spring-steel flat wire
18 Radial spring direction
20 Bearing assembly
30 Bearing unit
32 Outer ring
34 Inner ring
36 Rolling element
38 Recess
40 End side of the outer ring
42 Axial stop of the recess
50 Bearing inner ring
52 Recess
D Diameter of the shaft spring in the radially resilient spring section

The invention claimed is:

1. A wave spring comprising:
an axially resilient spring section including at least one one-layer wave-shaped spring configured to provide a spring force in an axial direction of the wave spring, and
a radially resilient spring section configured to provide a spring force in a radial direction,
wherein the axially resilient spring section is formed from a first length of flat wire and the radially resilient spring section is formed from a second length of flat wire, the second length of flat wire having a width greater than a thickness and being shaped into a cylinder such that the width extends in the axial direction and the thickness extends in the radial direction.

2. The wave spring according to claim 1, wherein the radially resilient spring section is configured as a spiral spring having at least two windings.

3. The wave spring according to claim 1, wherein the axially resilient spring section and the radially resilient spring section are manufactured from a same spring steel.

4. The wave spring according to claim 1, wherein the axially resilient spring section and the radially resilient spring section are manufactured from a unitary length of spring steel.

5. The wave spring according to claim 1, wherein the radially resilient spring section is manufactured from a different material than the axially resilient spring section.

6. The wave spring according to claim 5, wherein the radially resilient spring section is manufactured from a plastic material and the radially resilient spring section is manufactured from an elastomer material.

7. The wave spring according to claim 1,
wherein the first length of flat wire is formed from a first material and the second length of flat wire is formed from a second material different than the first material.

8. The wave spring according to claim 1,
wherein the first length of flat wire and the second length of flat wire are formed from a same material.

9. The wave spring according to claim 8,
wherein the first length of flat wire and the second length of flat wire are portions of a continuous length of flat wire.

10. The wave spring according to claim 1,
wherein the continuous length of flat wire is rotated at a transition from the axial spring section to the radial spring section.

11. A bearing assembly comprising:
a bearing unit having an outer ring and an inner ring configured to rotate with respect to each other, and
a wave spring according to claim 1 disposed on the outer ring or on the inner ring,
wherein the radially resilient spring section interacts with the inner ring or the outer ring to secure the wave spring to the bearing unit.

12. A wave spring comprising:
an axially resilient spring section including at least one one-layer wave-shaped spring configured to provide a spring force in an axial direction of the wave spring, and
a radially resilient spring section configured to provide a spring force in a radial direction,
wherein the wave spring is manufactured from a continuous flat wire that forms both the axially resilient spring section and the radially resilient spring section, wherein the flat wire is rotated at a transition from the axial spring section to the radial spring section.

13. A bearing assembly comprising:
a bearing unit having an outer ring and an inner ring configured to rotate with respect to each other, and
a wave spring according to claim 12 is disposed on the outer ring or on the inner ring,
wherein the radially resilient spring section interacts with the inner ring or the outer ring to secure the wave spring to the bearing unit.

14. The wave spring according to claim 12,
wherein the flat wire is rotated 90° at the transition from the axial spring section to the radial spring section.

15. A bearing assembly comprising:
a bearing unit having an outer ring and an inner ring configured to rotate with respect to each other, and
a wave spring disposed on the outer ring or on the inner ring, the wave spring including an axially resilient spring section having at least one one-layer wave-shaped spring configured to provide a spring force in an axial direction of the wave spring and a radially resilient spring section configured to provide a spring force in a radial direction,
wherein the radially resilient spring section interacts with the inner ring or the outer ring to secure the wave spring to the bearing unit.

16. The bearing assembly according to claim 15,
wherein the outer ring or the inner ring includes a circumferentially extending recess in which the radially resilient spring section is received.

17. The bearing assembly according to claim 16,
wherein the recess is oval or elliptical in cross-section and the radially resilient section of the wave spring is substantially circular in cross-section, or
wherein the radially resilient section of the wave spring is oval or elliptical in cross-section and the recess is substantially circular in cross-section.

* * * * *